United States Patent
Zane et al.

(10) Patent No.: US 9,635,431 B2
(45) Date of Patent: Apr. 25, 2017

(54) LIVE EVENT VIEWING VIA MIXED LIVE AND ON-DEMAND STREAMING

(71) Applicant: Kiswe Mobile Inc., Bethesda, MD (US)

(72) Inventors: Francis X. Zane, New Providence, NJ (US); Thomas J. Janiszewski, Andover, NJ (US); Celia H. Lee, Berkeley Heights, NJ (US); Christopher Boraski, Skillman, NJ (US); Maxim Campolo, Jersey City, NJ (US); Yung-Lung Ho, Bethesda, MD (US)

(73) Assignee: Kiswe Mobile Inc., Bethesda, MD (US)

( * ) Notice: Subject to any disclaimer, the term of this patent is extended or adjusted under 35 U.S.C. 154(b) by 0 days.

(21) Appl. No.: 14/928,031

(22) Filed: Oct. 30, 2015

(65) Prior Publication Data
US 2017/0064404 A1    Mar. 2, 2017

Related U.S. Application Data

(60) Provisional application No. 62/210,842, filed on Aug. 27, 2015.

(51) Int. Cl.
*H04N 7/173* (2011.01)
*H04N 21/482* (2011.01)
(Continued)

(52) U.S. Cl.
CPC ..... *H04N 21/4825* (2013.01); *H04L 65/4084* (2013.01); *H04L 67/02* (2013.01);
(Continued)

(58) Field of Classification Search
CPC .. H04N 21/482; H04N 21/472; H04N 21/488; H04N 21/458; H04N 21/431; H04N 21/462
See application file for complete search history.

(56) References Cited

U.S. PATENT DOCUMENTS 8,904,457 B2   12/2014   Sood et al.
2001/0047516 A1   11/2001   Swain et al.
(Continued)

FOREIGN PATENT DOCUMENTS

WO    2011123821 A1    10/2011
WO    2012114107 A2    8/2012

OTHER PUBLICATIONS

U.S. Appl. No. 14/851,942, filed in the name of Kiswe Mobile Inc. on Sep. 11, 2015 and entitled "Methods and Apparatus for Content Interaction."
(Continued)

*Primary Examiner* — John Schnurr
(74) *Attorney, Agent, or Firm* — Ryan, Mason & Lewis, LLP

(57) ABSTRACT

A media player or other type of client device is configured to obtain a plurality of playlists for a given item of media content from one or more servers over a network. The playlists comprise at least a sliding-window playlist and an on-demand playlist for the given item of media content with each such playlist identifying a plurality of media segments of the given item of media content. The client device comprises a playback module configured to play back portions of the given item of media content utilizing respective ones of the sliding-window and on-demand playlists. A navigation state machine controls switching of the playback module between playback of media segments from the sliding-window playlist and playback of media segments from the on-demand playlist responsive to user navigation within a timeline of the given item of media content using one or more navigational controls.

20 Claims, 4 Drawing Sheets

(51) Int. Cl.
  *H04L 29/06* (2006.01)
  *H04L 29/08* (2006.01)
  *H04N 21/431* (2011.01)
  *H04N 21/458* (2011.01)
  *H04N 21/462* (2011.01)
  *H04N 21/472* (2011.01)
  *H04N 21/488* (2011.01)

(52) U.S. Cl.
  CPC .............. *H04L 67/10* (2013.01); *H04L 67/42* (2013.01); *H04N 21/4316* (2013.01); *H04N 21/4586* (2013.01); *H04N 21/4622* (2013.01); *H04N 21/47202* (2013.01); *H04N 21/47217* (2013.01); *H04N 21/4882* (2013.01)

(56) References Cited

U.S. PATENT DOCUMENTS

| | | |
|---|---|---|
| 2007/0130597 A1 | 6/2007 | Parker et al. |
| 2009/0164032 A1 | 6/2009 | Kedem |
| 2011/0252118 A1* | 10/2011 | Pantos .............. G06F 17/30053 709/219 |
| 2014/0143437 A1 | 5/2014 | Mathur et al. |
| 2014/0165120 A1 | 6/2014 | Losev et al. |
| 2014/0189761 A1 | 7/2014 | Sood et al. |
| 2014/0229976 A1 | 8/2014 | Ma et al. |
| 2014/0280784 A1 | 9/2014 | Moroney et al. |
| 2014/0379873 A1 | 12/2014 | Biderman et al. |
| 2015/0172343 A1 | 6/2015 | Pantos et al. |
| 2015/0229695 A1 | 8/2015 | Kim et al. |

OTHER PUBLICATIONS

U.S. Appl. No. 14/699,515, filed in the name of Kiswe Mobile Inc. on Apr. 29, 2015 and entitled "Virtual Immersion via Streamed Content Adaptation."

Apple Technical Note TN2288, "Example Playlist Files for Use with HTTP Live Streaming," https://developer.apple.com/library/ios/technotes/tn2288/_index.html, May 9, 2012, 17 pages.

* cited by examiner

LIVE EVENT VIEWING VIA MIXED LIVE AND ON-DEMAND STREAMING

PRIORITY CLAIM

This application claims priority to U.S. Provisional Patent Application Ser. No. 62/210,842, filed Aug. 27, 2015 and entitled "Live Event Viewing via Mixed Live and VOD Streaming," which is incorporated by reference herein in its entirety.

FIELD

The field relates generally to live video and other types of media content, and more particularly to processing of media content.

BACKGROUND

The rapidly growing use of mobile devices such as laptops, tablets and cellphones has greatly diversified the available modes of media consumption. In these and other contexts, a wide variety of different media streaming techniques are known, including techniques for streaming of media over the Internet using hypertext transfer protocol (HTTP). A more specific example of an HTTP streaming technique is the Apple HTTP Live Streaming (HLS) protocol. Despite recent advances in this area, a need remains for improved techniques for streaming of live video and other types of media content.

SUMMARY

Illustrative embodiments of the invention significantly enhance streaming performance for live video and other types of media content. By way of example only, this is done in some embodiments by providing a media player with functionality for live event viewing via mixed live and on-demand streaming.

In one embodiment, a media player or other type of client device is configured to obtain a plurality of playlists for a given item of media content from one or more servers over a network. The playlists comprise at least a sliding-window playlist and an on-demand playlist for the given item of media content with each such playlist identifying a plurality of media segments of the given item of media content. The client device comprises a playback module configured to play back portions of the given item of media content utilizing respective ones of the sliding-window and on-demand playlists, a display screen configured to present media content output from the playback module, a set of navigational controls associated with the display screen, and an application program configured to control operation of the playback module responsive to activation of particular ones of the navigational controls. The application program implements a navigation state machine that controls switching of the playback module between playback of media segments from the sliding-window playlist and playback of media segments from the on-demand playlist responsive to user navigation within a timeline of the given item of media content using one or more of the navigational controls.

The on-demand playlist in some embodiments is one of a plurality of related versions of the on-demand playlist that are sequentially created for the given item of media content by a content provider responsive to generation of respective new media segments during a live event. Such an arrangement is distinct from a conventional single on-demand playlist that is fixed and static for a given item of media content.

The client device in one or more embodiments is advantageously configured such that a new version of the on-demand playlist need not be downloaded by the media player for each additional media segment that is generated for the given item of media content. Instead, a new version of the on-demand playlist is downloaded only as required based on user navigation within the timeline. This significantly reduces the network bandwidth overhead associated with downloading of playlists for playback of media content of a live event, relative to conventional repeated downloading of event playlists.

DETAILED DESCRIPTION

Embodiments of the invention will be illustrated herein in conjunction with exemplary content delivery systems that include particular arrangements of networks, devices and other components. It should be understood, however, that embodiments of the invention are more generally applicable to a wide variety of other types of content delivery systems and associated networks, devices or techniques. The term "content" as used herein is intended to be broadly construed so as to encompass, for example, live video or other types of multimedia streams as well as other types of content that are deliverable to devices over one or more networks in a content delivery system.

Embodiments of the invention include but are not limited to methods, apparatus, systems, processing devices, integrated circuits, and computer-readable storage media having computer program code embodied therein.

Some embodiments of the invention are configured to utilize streaming techniques that are based at least in part on the above-noted Apple HLS protocol. However, it is to be appreciated that other embodiments can be configured utilizing a wide variety of other types of streaming protocols and accordingly are not limited to use with live streaming or HTTP.

Figure 1:
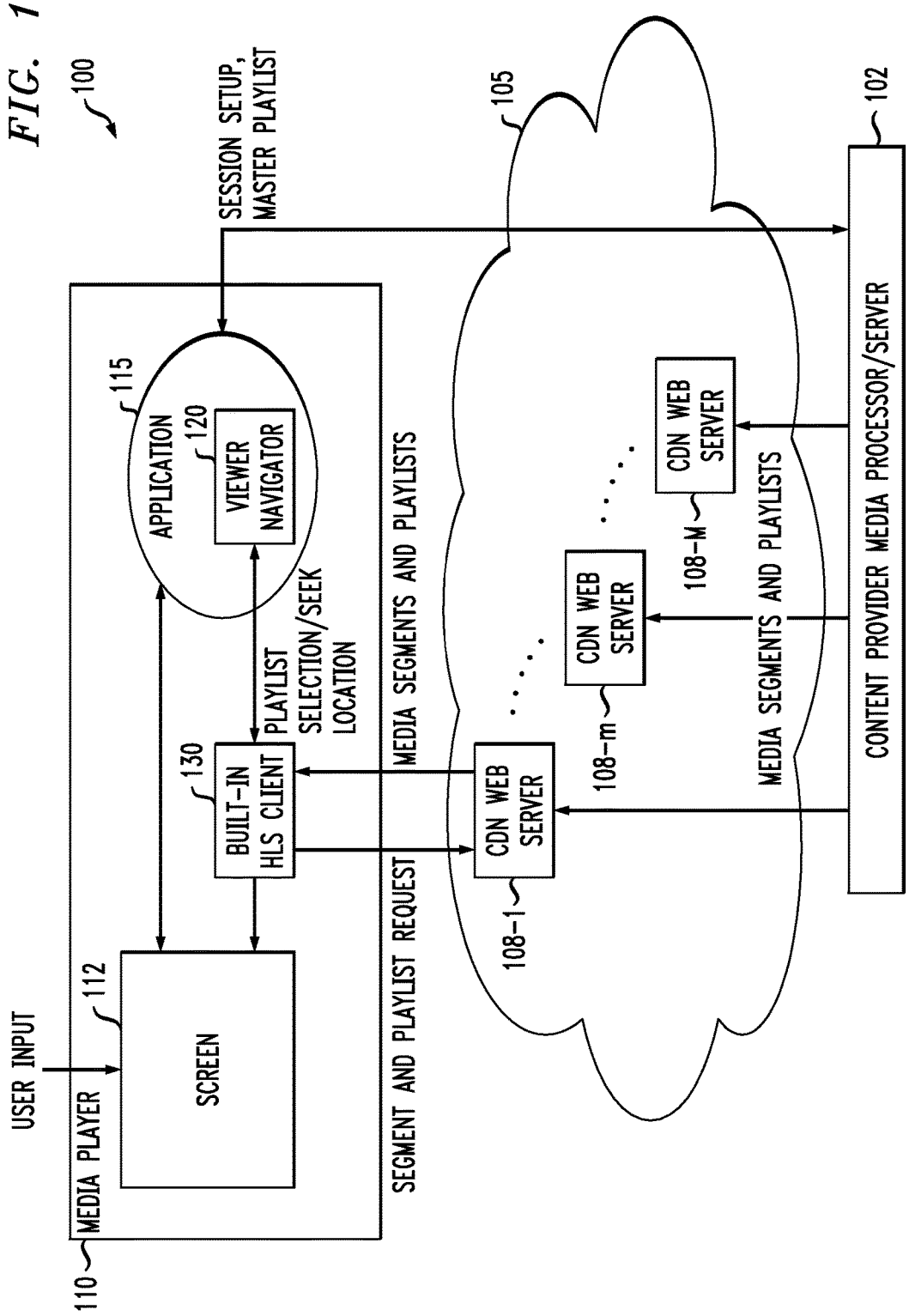
FIG. 1 is a block diagram of an exemplary content delivery system with live event viewing via mixed live and on-demand streaming in an illustrative embodiment.

FIG. 1 shows a content delivery system 100 that implements functionality for live event viewing via mixed live and VoD streaming. In this embodiment, the content delivery system 100 illustratively comprises a content provider media processor/server 102 coupled to a network 105 that includes a plurality of content delivery network (CDN) web servers 108-1, . . . 108-$m$, . . . 108-M. The content provider media processor/server 102 provides media segments and playlists to the CDN web servers 108.

The playlists may be illustratively implemented as respective "index files," although other types of playlists can be used in other embodiments. Such an index file or other type of playlist in some embodiments illustratively provides an ordered list of the Uniform Resource Locators (URLs) of the corresponding media segments. Other types of media segment identifiers can be used in other embodiments. Examples of playlists and associated media segments will be described in more detail below in conjunction with the diagram of FIG. 2.

The content provider media processor/server 102 illustratively receives content from a plurality of sources, and encodes and segments media streams from the sources. Such sources may include multiple live video sources associated with a live event. Also coupled to the network 105 is a media player 110, which may comprise a mobile device such as a laptop, tablet or cellphone. Such a device is also referred to herein as a "client device." A wide variety of different media players or other types of client devices can be used in other embodiments.

The CDN web servers 108 in the FIG. 1 embodiment are examples of what are also referred to as distributed HTTP based web servers or simply as distributed web servers. Such servers can be configured to deliver a wide variety of media content other than live video. The CDN web servers 108 in some embodiments comprise a collection of distributed web servers that are set up in a cloud or other type of network in order to distribute live video or other types of media content. Numerous other arrangements of distributed web servers can be used in other embodiments.

The content provider media processor/server 102 may comprise one or more video servers, and may also be referred to as a content provider server.

The network 105 over which the content provider media processor/server 102, CDN web servers 108 and media player 110 communicate is assumed to support HTTP communications. It should be noted that, although HTTP communications are used in the present embodiment, other embodiments can utilize other types of protocols for media streaming over the Internet, or more generally any of a wide variety of other techniques for media content delivery. At least a portion of the CDN web servers 108 may be part of a cloud arrangement.

Each of the CDN web servers 108 is configured for media streaming. Each such web server illustratively caches video segments and associated index files received from the content provider media processor/server 102 over the network 105. In addition, each of the CDN web servers 108 communicates over the network 105 with the media player 110. The content delivery system 100 can of course include multiple media players, although only a single such media player is shown in the figure for clarity and simplicity of illustration.

The media player 110 comprises a screen 112, an application 115 having a viewer navigator 120, and a built-in HLS client 130. User input can be provided to the media player 110 as touch input via the screen 112. Other user input mechanisms, such as a mouse or keyboard, can be used in addition to or in place of the touch-screen input mechanism. It is also possible that user input can be provided to the media player 110 via spoken commands or gestures, which are recognized by respective speech recognition or gesture recognition functionality implemented in the media player 110. Various combinations of these and other user input mechanisms can be used in a given embodiment. A "user" of the media player 110 is also referred to herein in the context of some embodiments as a "viewer."

The application 115 in this embodiment is assumed to be a live video streaming application. The application 115 can include additional functionality beyond that associated with the viewer navigator 120, as will be appreciated by those skilled in the art. Accordingly, the viewer navigator 120 is shown in this embodiment as a module implemented within the application 115. Numerous other modules providing other functionality can also be implemented within the application, although such additional modules are not shown in the figure. Moreover, the media player 110 can incorporate multiple applications, although only a single application is shown in the present embodiment. In some implementations, application 115 can comprise portions of multiple applications. Accordingly, the term "application" as used herein is intended to be broadly construed. Such an application is also referred to herein as an "application program" although it is to be appreciated that an application program can itself comprise multiple distinct software programs.

The application 115 and the built-in HLS client 130 are illustratively implemented at least in part within or otherwise in association with an operating system of the media player 110. The viewer navigator 120 implemented in the application 115 directs the built-in HLS client 130 via playlist selection and/or seek location information. The built-in HLS client 130 requests media segments and playlists from the CDN web servers 108 and in response to such requests receives the media segments and playlists from those servers.

The media player 110 with built-in HLS client 130 in the FIG. 1 embodiment is just one example of a client device. It is to be appreciated that a wide variety of different media players or other client devices can be used, and such media players or other client devices need not be implemented using a built-in HLS client arrangement. For example, other types of built-in clients can be used. Thus, a "client device" as that term is broadly used herein should not be construed as being limited, for example, to a hardware-assisted media player such as that of FIG. 1 that utilizes a client built into the media player operating system. Accordingly, in other embodiments, a client device can include an internal media player. The built-in HLS client can itself be considered a type of media player.

The content provider media processor/server 102 illustratively exchanges session startup and master playlist information with the application 115 in the media player 110. The content provider media processor/server 102 also provides media segments and playlists to the CDN web servers 108 over the network 105.

The content provider media processor/server 102 illustratively includes one or more video servers each comprising one or more encoder/segmenter modules. Each such encoder/segmenter module comprises a serial combination of an encoder and a segmenter and processes one or more video signals received from one or more video sources. Media segments and associated index files are supplied by each video server to at least a subset of the CDN web servers 108 over the network 105 via one or more connections. By way of example, a video server comprising M encoder/segmenter modules can be used to generate M content streams.

In some embodiments, the content provider media processor/server 102 is configured to generate a plurality of content streams offset from one another in time for each of the multiple content streams corresponding to respective ones of the live sources, possibly using techniques of the type described in U.S. patent application Ser. No. 14/546,614, filed Nov. 18, 2014 and entitled "Methods and Apparatus for Reducing Latency Shift in Switching between Distinct Content Streams," which is incorporated by reference herein in its entirety. These techniques advantageously reduce latency when switching between content streams. It is to be appreciated, however, that utilization of such techniques is not a requirement of the present embodiment or other embodiments herein.

In an embodiment that generates a plurality of content streams offset from one another in time for each live source, a separate set of encoder/segmenter modules may be provided within a given video server for each of the live sources. Additionally or alternatively, multiple instances of the video server can be implemented within the content provider media processor/server, for example, with each such video server providing a set of encoder/segmenter modules for just one of the live sources. Thus, a given implementation of a video server comprising encoder/segmenter modules can illustratively be associated with only one of the live sources. The term "video server" as used herein is intended to be broadly construed, so as to encompass these and other arrangements of one or more sets of encoders and segmenters.

Moreover, although the encoder/segmenter modules each comprise a serial arrangement of an encoder and a segmenter, in other embodiments separate modules can be used to implement respective encoding and segmentation functionality. Such modules may comprise, for example, an integrated circuit or a portion of an integrated circuit.

The encoding of video in the FIG. 1 embodiment can utilize known encoding techniques such as H.264. Also, the segmenting of the encoded video can be performed in accordance with known streaming protocols such as Apple HLS or Microsoft Smooth Streaming (MSS). It is to be appreciated, however, that a wide variety of different encoding and segmenting techniques can be used in other embodiments, including those techniques described in the above-cited U.S. patent application Ser. No. 14/546,614.

Each of the CDN web servers 108 stores multiple index files as well as sets of video segments associated with respective ones of those index files. As noted above, index files are considered examples of what are more generally referred to herein as "playlists." The video segments are considered an example of what is more generally referred to herein as "media segments." A wide variety of different arrangements of index files or other types of playlists, and associated video segments or other types of media segments, can be used in different embodiments.

For example, in some embodiments, live video can be streamed within the content delivery system 100 utilizing HTTP streaming technology such as the above-noted HLS or MSS protocols. With HTTP streaming, video associated with a given content stream is first compressed and then segmented at the video server of the content provider media processor/server 102. As soon as a given video segment is ready, it is delivered to the CDN web servers 108 so as to be available for mass distribution within the system 100. At session initiation, the media player 110 obtains an initial master playlist indicating the available content streams and their associated web addresses (e.g., URLs). Depending on the streaming technology, locating the available content streams may be an indirect process where the master playlist points to index files that can be polled to indicate the URL and availability of the next segment.

Media streaming using HTTP based protocols has become ubiquitous due to its flexibility, compatibility with generic web servers such as CDN web servers for content distribution, and ability to traverse common firewalls. HTTP streaming standards such as Apple HLS generally work by breaking the content stream into small HTTP-based file segments, which are distributed to the CDN web servers and downloaded by request by a media player client via each segment's uniquely assigned web address (e.g., URL).

In some embodiments, HLS streaming relies on playlists that contain the URLs of the available media segments. These playlists reside in the same CDN web servers 108 with the media segments to be streamed. At session initiation, the content provider media processor/server 102 downloads a master playlist containing the URLs of the various alternative playlists available for the desired content. Mostly, the optional playlists allow the player to optimize playback based on screen resolution and bandwidth availability. Once given the playlist URLs, the built-in HLS client 130 can autonomously download the referenced playlist, request media segments, then reconstruct and play the requested video stream.

In addition to the above-noted bandwidth options, HLS supports different content specific playlists, including live playlists, event playlists, and VoD playlists, as described in Apple Technical Note TN2288, which is incorporated by reference herein. The VoD playlist, which is used for playback of prerecorded media, contains references to all the media segments for the video. The client needs to download the list only once at the start of a session. On the other hand, both live and event types of broadcast require continuous updates to their respective playlists as new video segments are created and uploaded to the CDN web servers 108. As such, the client must also repeatedly download the referenced playlist to get the latest media segment URL.

The difference between a live playlist and an event playlist is in the number of segment entries maintained at any given time. In a live playlist, also known as a sliding window playlist, references to older segments are removed as new entries are added. Consequently, the number of entries in a live playlist is nearly constant, providing a sliding window, typically ranging from a few seconds to a few minutes of video, into the stream. In an event playlist, references to older segments are never removed, resulting in an ever-expanding playlist as the event continues. For a long event, or if the content provider chooses to encode the video stream using short segments, repeatedly downloading a long event playlist can add significant bandwidth overhead for the viewer.

Nonetheless, there is a need for event type streaming as it provides a wider time range for a user to navigate, e.g., rewind, pause, and forward, within a live video stream, relative to the live or sliding window playlist. With live streaming, a user is constrained to navigate only within a live playlist time window defined by the limited number of available segment references. Furthermore, to minimize playback interruption due to network jitter, the live playlist time window can be a few segment durations less than the time frame spanned by all the segments in the playlist. Alternatively, the long event playlist enables a user to rewind, forward, and replay from any point in an event up to the live moment. References herein to "rewind" and "forward" should be understood to additionally or alternatively encompass respective fast-rewind and fast-forward navigation controls.

In the present embodiment, the media player is configured to provide a timeline navigation capability similar to that of an event streaming mode but without using the event playlist and thereby in a manner that significantly reduces bandwidth utilization.

This is illustratively achieved in the FIG. 1 embodiment through the configuration of the viewer navigator 120 of the application 115 running on the media player 110. The viewer navigator 120 in the present embodiment is implemented as an enhanced video timeline navigation software module within the application. It has full rewind and forward navigation capability during a live streaming event but does not require the built-in HLS client 130 to download a full event playlist with each new video segment creation. This substantially reduces the amount of bandwidth that would otherwise be required.

The viewer navigator 120 in the present embodiment illustratively maintains and utilizes two coactive playlists for each content stream during an event streaming session. One of the playlists is a live playlist with a sliding window set of segment URLs and the other is a VoD playlist with all segment URLs up to the live moment. Unlike traditional VoD playlists, however, entries are added to this VoD playlist as new segments are created and loaded to the CDN web servers 108. In other words, the VoD playlist in this embodiment behaves almost like an event playlist in that it is a dynamic list and grows until the end of the event streaming session. Each time the VoD playlist is downloaded, however, the client 130 assumes that it is an unchanging list. The viewer navigator 120 instructs the client to alternatively download and play from one of the two coactive playlists, the live playlist most of the time and the VoD playlist as needed, in order to provide full navigation capability while minimizing playlist download overhead. The live and VoD playlists noted above are examples of what are more generally referred to herein as sliding-window and on-demand playlists.

As noted above, the media player 110 of FIG. 1 is an example of a type of "client device." Such a client device in the present embodiment is configured to obtain multiple playlists for a given item of media content from one or more of the CDN web servers 108 over the network 105. These multiple playlists include at least a sliding-window playlist and an on-demand playlist for the given item of media content. Each such playlist identifies a plurality of media segments of the given item of media content. For example, the sliding-window and on-demand playlists may illustratively comprise respective ordered lists of identifiers of respective ones of the media segments of those playlists. In some embodiments, the on-demand playlist is one of a plurality of related versions of the on-demand playlist that are sequentially created for the given item of media content by a content provider responsive to generation of respective new media segments during a live event.

The built-in HLS client 130 of the media player 110 is an example of what is more generally referred to herein as a "playback module." Such a playback module is configured to play back portions of the given item of media content utilizing respective ones of the sliding-window and on-demand playlists. The screen 112 of the media player 110 is configured to present media content output from the playback module. Other types of built-in streaming clients can be used in place of the built-in HLS client 130, although as mentioned elsewhere herein, such built-in streaming clients are not required, and alternative playback modules can be used in other embodiments.

As will be described in more detail below in conjunction with FIG. 3, a set of navigational controls are presented on or otherwise associated with the display screen 112 of the media player 110. The application 115 is configured to control operation of the built-in HLS client 130 responsive to activation of particular ones of the navigational controls. This control functionality is illustratively implemented using the viewer navigator 120 of the application 115. The application 115 is assumed to comprise at least one software program running on a processor of the media player 110.

Figure 4:
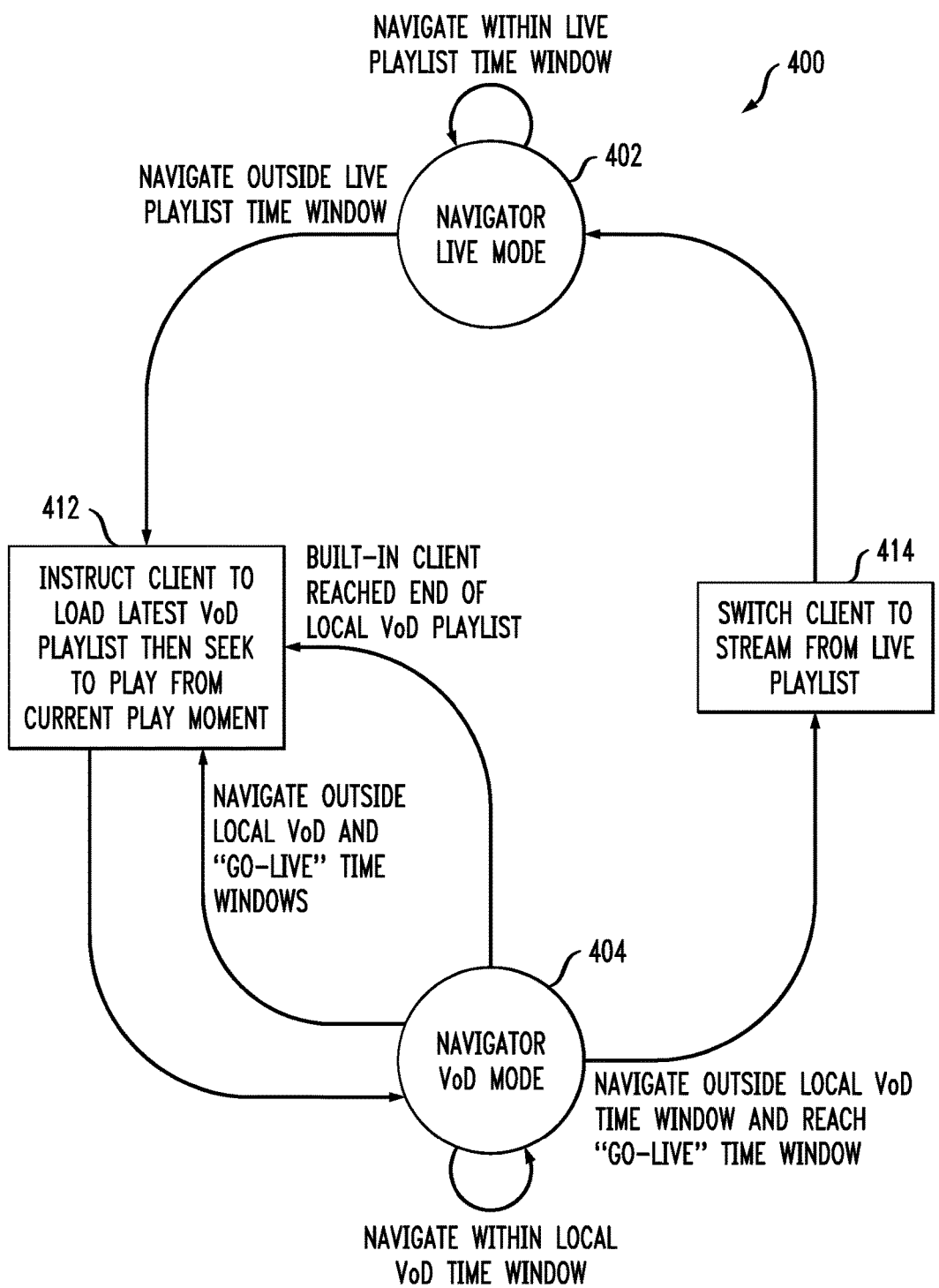
FIG. 4 is a state diagram of an example navigation state machine of a viewer navigator in a media player in an illustrative embodiment.

The application 115 implements a navigation state machine that controls switching of the built-in HLS client 130 between playback of media segments from the sliding-window playlist and playback of media segments from the on-demand playlist responsive to user navigation within a timeline of the given item of media content using one or more of the navigational controls. One possible implementation of the navigation state machine is illustrated in FIG. 4. This navigation state machine is assumed in some embodiments to be implemented within the viewer navigator 120 of the application 115.

Figure 2:
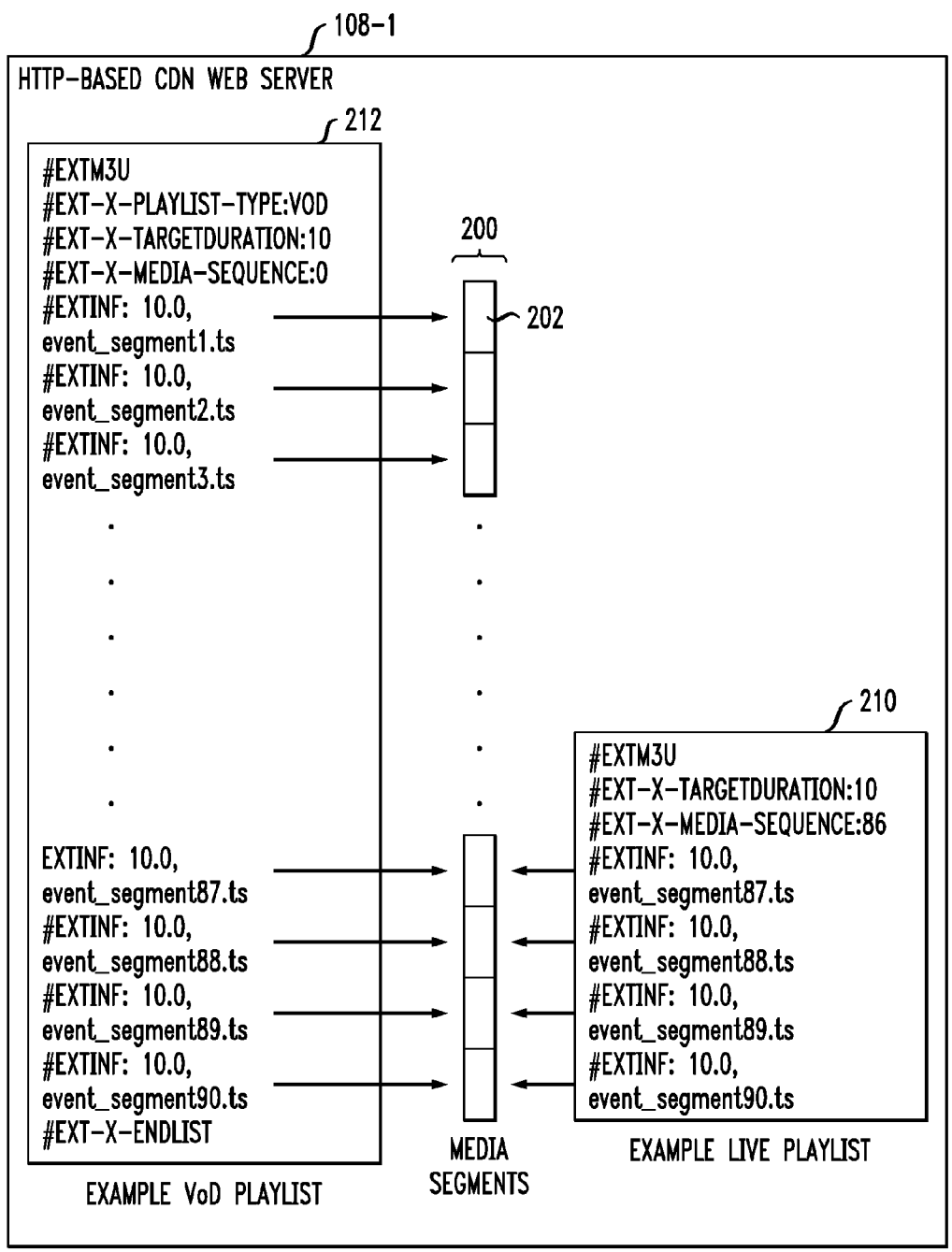
FIG. 2 shows snapshots of example live and on-demand playlists associated with media segments in a web server in an illustrative embodiment.

FIG. 2 illustrates the association between portions of a set 200 of media segments 202 of a given content item and corresponding sliding-window and on-demand playlists 210 and 212, at a particular point in time. The sliding-window and on-demand playlists in this embodiment are more particularly referred to as example live and VoD playlists.

The example VoD playlist 212 hosted by a given CDN web server 108-1 at the given point in time is shown in FIG. 2 along with its corresponding coactive live playlist 210. These example playlists point to different portions of the set 200 of media segments 202 on the same CDN web server 108-1. More particularly, the VoD playlist 212 has 90 video segments at this point in time, denoted event_segment1.ts through event_segment90.ts. The live playlist 210 has a sliding window of 4 segments and includes the segments denoted event_segment87.ts through event_segment90.ts.

Other than differences in the file descriptor and the "endlist" entry at the end of the VoD playlist, the VoD playlist and a corresponding event playlist appear similar. However, they are further distinct in the ways web servers and clients handle them. In particular, on the web server side, the HLS standard specifies that VoD playlists should not be changed. Thus, when an entry is added to an existing VoD playlist, the content provider media processor/server 102 is in effect "recreating" a completely new VoD playlist that is one segment longer. On the client side, once it is directed to play from a VoD playlist, the client downloads the latest version which provides access to all media segments from the beginning of a session up to the playlist download time. From that point on, the client assumes that the event has concluded as of the playlist download time and would not continuously download the playlist.

As illustrated in FIG. 2, the older media segments are referenced only by the VoD playlist 212, while the most recent stream segments, those with index numbers 87 to 90, are referenced by both the VoD playlist 212 and the live playlist 210. In other words, the example live event stream has created 90 video segments up to the moment. As the example configuration utilizes 10 second segments and 4 segment live playlist sliding windows, one can infer that the event has gone on for 900 seconds, and 86 segment URLs have been removed from the live playlist thus far. It is assumed that, in all cases, only one copy of each media segment is kept in this embodiment. To offer full up-to-the-moment live event playback access, the content provider media processor/server 102 instructs the CDN web servers 108 to not delete the media segments until the final conclusion of the live event.

Figure 3:
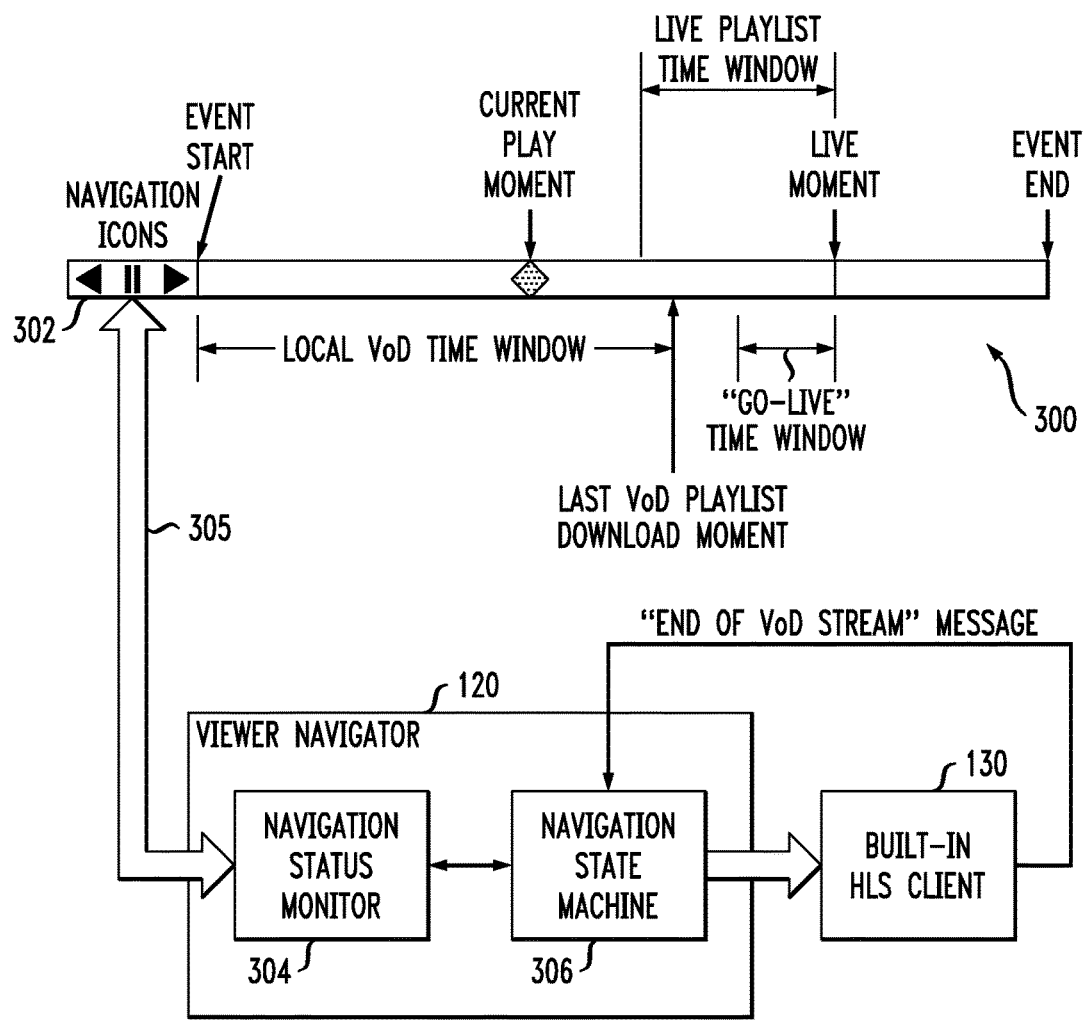
FIG. 3 is a combined block and timing diagram showing the operation of a viewer navigator in a media player in an illustrative embodiment.

Referring now to FIG. 3, a set of navigational controls comprises a video time navigation bar 300 controlled by a viewer during an event streaming session. The time navigation bar 300 is illustratively presented to the viewer on the screen 112 of the media player 110. The time navigation bar 300 shows the progress of current play and includes rewind, forward, and pause navigation icons 302 at one end. The time navigation bar 300 comprises an example of a timeline of a given item of media content using one or more navigational controls corresponding to respective ones of the navigation icons 302. The given item of media content is assumed to comprise a live event having an event start and an event end.

In this example, the time navigation bar 300 spans the entire event duration and the diamond symbol marks the current play moment. During live play, the diamond will be positioned near the live moment and will move to the right with time. Via touch screen or mouse pad entry, or other type of user input mechanism, a user can move the diamond symbol backward, e.g., rewind, or, from a rewound position, move the diamond symbol ahead, e.g., forward. This illustratively involves use of the navigation icons 302, but additionally or alternatively could be achieved in other ways, such as, for example, clicking and dragging the diamond symbol to alter its position within the time navigation bar 300. Numerous alternative arrangements of navigation bars, navigation icons or other sets of one or more navigational controls can be used in other embodiments.

The diagram of FIG. 3 additionally illustrates various time windows associated with portions of the time navigation bar 300, including a local VoD time window, a "go-live" time window and a live playlist time window. Movement of the current play moment across the boundaries of these windows may trigger a state change in a navigational state machine of the viewer navigator 120. The "go-live" time window is shorter in duration than the live playlist time window, as illustrated. The "go-live" and live playlist time windows are both aligned with the live moment and will jointly slide rightward with time as the live event progresses. The local VoD time window, however, is bounded on the right side by the latest VoD playlist download time. On the left, the local VoD time window coincides with the event start time. Its range does not change until the next time the built-in HLS client 130 is directed by the viewer navigator 120 to reload the latest version of the VoD playlist.

Also illustrated in FIG. 3 is a more detailed view of the viewer navigator 120. In this embodiment, the viewer navigator 120 comprises a navigation status monitor 304 that interfaces with the navigation icons 302 of the time navigation bar 300 via a monitoring interface 305. The navigation status monitor 304 is illustratively coupled between the navigation icons 302 and a navigation state machine 306. The built-in HLS client 130 is configured to provide a message to the navigation state machine 306 indicative of an end of the on-demand playlist being reached. The message in this embodiment is illustratively shown in the figure as an "end of VoD stream" message.

The navigator status monitor 304 of the viewer navigator 120 manages the time navigation bar 300 and keeps track of all the play timing indicators and window boundary locations. It also notifies the navigation state machine 306 of status changes caused by a user's navigational requests. The navigation state machine 306 interacts with the built-in HLS client 130 and under certain conditions receives the "end of VoD stream" message therefrom as indicated.

FIG. 4 shows a state diagram 400 of the navigation state machine 306 of the viewer navigator 120 in an illustrative embodiment. It is assumed in this embodiment that the given item of media content being played by the media player 110 comprises media content for a live event. The navigation state machine 306 comprises a live mode navigation state 402 in which the built-in HLS client 130 plays back media segments from the sliding-window playlist and an on-demand mode or VoD mode navigation state 404 in which the built-in HLS client 130 plays back media segments from the on-demand playlist. Again, the sliding-window and on-demand playlists in this embodiment are more specifically referred to as respective live and VoD playlists. Transitions from the live mode navigation state 402 to the VoD mode navigation state 404 involve performance of operations associated with step 412. Similarly, transitions from the VoD mode navigation state 404 to the live mode navigation state 402 involve performance of operations associated with step 414.

In typical operation, the viewer navigator 120 is in live mode most of the time. In this mode, the client 130 is streaming from a live playlist and the navigator waits for navigation commands from the user. If the user navigates within the live playlist time widow, the navigator instructs the client to seek to a new location and stays in live mode, as indicated by the arrow leaving from and returning to state 402. Once a user navigates outside of the live playlist window, the client 130 will be switched to VoD streaming, thus triggering the download of the latest VoD playlist in step 412. The navigator then transitions to the VoD mode corresponding to state 404. Content referenced by the latest downloaded VoD playlist now spans a new VoD time window, also referred to above as the local VoD time window. Since the client 130 will not download a new VoD playlist automatically, the local VoD time window will be constant for the duration of time that the navigator stays in this VoD mode. Similar to the live mode, the client can navigate freely within the local VoD time window via simple seek instructions and the navigator will not leave this mode until the user chooses to forward outside of the local VoD time window, or if the client has played to the end of the local VoD playlist, as indicated by the "end of VoD stream" message.

When the user or client does move beyond the boundary of the local VoD time window, the navigator has two options. First, if the user chooses to view content created within a preset "go-live" period, usually shorter than the live playlist time window, the navigator assumes that the user wishes to "go-live" and thus instructs the client to stream from the live playlist in step 414 and transitions itself to live mode. Alternatively, if the user navigates outside of both the local VoD time window and the "go-live" time window or if the client has reached the end of the VoD stream, the navigator will switch the client to the latest VoD playlist in step 412. While the new VoD playlist illustratively has the same file name as the previously downloaded VoD playlist, the re-loaded playlist will contain additional references to the most current video segments. Afterwards, the navigator re-enters the VoD mode and the client will resume streaming from the desired play moment.

The particular states, steps, operations and transitions illustrated in the state diagram 400 of FIG. 4 are presented by way of example only, and numerous alternative arrangements of a navigation state machine can be used in other embodiments.

It should be noted that the VoD playlist can grow to a significant size with a long event, particularly if the segment sizes are chosen to be short by the content provider media processor/server 102. However, with the present embodiment, the VoD playlist is downloaded only as needed on an individual client basis. This is a significant saving in bandwidth compared with a standard HLS event streaming approach where a playlist spanning an event would have to be downloaded repeatedly by every client.

The present embodiment is also scalable, in a manner consistent with other standard HTTP based streaming methods, for several reasons. For example, most of the functionality is implemented in the viewer navigators of individual player applications. Also, additional work by the content provider media processor/server 102 is minimal in that it only needs to specify a sufficiently long life for the media segments, and upload two playlists instead of one to the CDN web servers 108. In addition, once a session has started, each player application can independently navigate through its content stream without specialized messaging to or from either the CDN web servers or the content provider media processor/server. Moreover, the present embodiment works with standard based built-in clients and HTTP servers.

Illustrative embodiments are not limited to use with the HLS protocol. For example, the disclosed embodiments can be adapted to save bandwidth with any HTTP based streaming protocol, including the Microsoft MSS protocol. Moreover, it is to be appreciated that other embodiments can be configured utilizing a wide variety of other types of streaming protocols and accordingly are not limited to use with live streaming or HTTP.

In some situations, a client may have to switch frequently from one playlist to another. Since the media takes a finite amount of time to download and start playing from a new playlist, it can be advantageous to instruct the client to open a second parallel streaming session with a hidden screen for the new playlist content. In the meantime, the currently displayed session continues with the previous playlist. Once the parallel session has successfully started, the hidden screen is uncovered and the switchover can take place smoothly. It is also possible to open more than two parallel streaming sessions in a similar manner.

As mentioned above in conjunction with FIGS. 3 and 4, when the built-in HLS client 130 plays to the end of a VoD playlist, it returns an "end-of-stream" message to the viewer navigator 120 and stops playing. The viewer navigator will than instruct the built-in HLS client to "switch" to the latest VoD playlist which might result in a brief play interruption. To eliminate this interruption, the viewer navigator may initialize a clock each time a user navigates to or within a local VoD time window. The timer alerts the navigator before the client encounters an end to the local VoD playlist so a fresh VoD stream may be started in a hidden screen in a manner similar to that described above.

Other embodiments can be configured to switch camera streams in a multi-camera broadcast. For example, to implement HLS compliant multi-camera broadcast, the content provider media processor/server 102 lists all camera stream playlist URLs in the master playlist downloaded during session initiation. To switch camera streams when the viewer navigator is in either live or VoD mode, the client 130 changes the respective present playlist URL to the new camera stream playlist URL, and then the client seeks to the same current play moment. The navigator state machine remains in the same state.

Such an arrangement can additionally or alternatively be configured, for example, to allow a user to switch between different camera views in conjunction with playback from a rewind position. Accordingly, embodiments can be configured to permit switching of camera streams during time-shifted playback.

Embodiments of the invention can be implemented using any type of mobile device or more generally any other type of client device, including, for example, desktop, laptop or tablet personal computers, smart televisions, smart watches, gaming systems and other processing devices.

It should once again be noted that the above-described arrangements are exemplary only, and alternative arrangements can be used in other embodiments.

The disclosed techniques can provide significant advantages in numerous content delivery contexts other than live event video.

A given client, server or other component in the FIG. 1 system is configured utilizing a corresponding processing device comprising a processor coupled to a memory. The processor executes software code stored in the memory in order to control the performance of processing operations and other functionality. The processing device also comprises a network interface that supports communication over one or more networks.

The processor may comprise, for example, a microprocessor such as the MPU noted above, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

The memory stores software code for execution by the processor in implementing portions of the functionality of the processing device. A given such memory that stores software code for execution by a corresponding processor is an example of what is more generally referred to herein as a computer-readable storage medium having computer program code embodied therein, and may comprise, for example, electronic memory such as SRAM, DRAM or other types of random access memory, read-only memory (ROM), magnetic memory, optical memory, or other types of storage devices in any combination.

Articles of manufacture comprising such computer-readable storage media are considered embodiments of the invention. The term "article of manufacture" as used herein should be understood to exclude transitory, propagating signals.

In addition, embodiments of the invention may be implemented in the form of integrated circuits comprising processing circuitry configured to implement processing operations associated with content delivery.

The particular configurations of content delivery systems described herein are exemplary only, and a given such system in other embodiments may include other elements in addition to or in place of those specifically shown, including one or more elements of a type commonly found in a conventional implementation of such a system.

For example, in some embodiments, a content delivery system may be configured to utilize the disclosed techniques to provide additional or alternative functionality in other contexts. The disclosed techniques can be similarly adapted for use in a wide variety of other types of content delivery systems.

It is also to be appreciated that the particular process steps used in the embodiments described above are exemplary only, and other embodiments can utilize different types and arrangements of processing operations.

It should again be emphasized that the embodiments of the invention as described herein are intended to be illustrative only. Other embodiments of the invention can be implemented utilizing a wide variety of different types and arrangements of content delivery systems, networks, and devices than those utilized in the particular embodiments described herein. In addition, the particular assumptions made herein in the context of describing certain embodiments need not apply in other embodiments. These and numerous other alternative embodiments will be readily apparent to those skilled in the art.

What is claimed is:

1. An apparatus comprising:
a client device comprising a processor coupled to a memory and configured to obtain a plurality of playlists for a given item of media content from one or more servers over a network;
the playlists comprising at least a sliding-window playlist and an on-demand playlist for the given item of media content with each such playlist identifying a plurality of media segments of the given item of media content;
the client device being further configured to play back portions of the given item of media content utilizing respective ones of the sliding-window and on-demand playlists;
the client device further comprising:
a display screen configured to present media content output;
a set of navigational controls associated with the display screen; and
an application program stored in the memory and executed by the processor and configured to control playback operations of the client device responsive to activation of particular ones of the navigational controls;
wherein the application program implements a navigation state machine that controls switching of the client device between playback of media segments from the sliding-window playlist and playback of media segments from the on-demand playlist responsive to user navigation within a timeline of the given item of media content using one or more of the navigational controls;
wherein the navigation state machine comprises a live mode navigation state in which the client device plays back media segments from the sliding-window playlist and an on-demand mode navigation state in which the client device plays back media segments from the on-demand playlist; and
wherein responsive to user navigation to a playback point within the timeline that is outside of a time window of the on-demand playlist but inside a specified go-live time window in the on-demand mode navigation state, the navigation state machine transitions from the on-demand mode navigation state to the live mode navigation state.

2. The apparatus of claim 1 wherein in conjunction with a transition of the navigation state machine from the live mode navigation state to the on-demand mode navigation state, an updated version of the on-demand playlist is obtained and utilized by the client device in playing back a portion of the given item of media content.

3. The apparatus of claim 1 wherein the sliding-window and on-demand playlists comprise respective ordered lists of identifiers of respective ones of the media segments of those playlists.

4. The apparatus of claim 2 wherein the application program comprises a viewer navigator program running on the client device.

5. The apparatus of claim 3 wherein the application program further comprises a navigation status monitor coupled between the navigational controls and the navigation state machine.

6. The apparatus of claim 4 wherein the playback operations are implemented at least in part by a built-in streaming client of the client device.

7. The apparatus of claim 6 wherein the built-in streaming client is configured to provide a message to the navigation state machine indicative of an end of the on-demand playlist being reached.

8. The apparatus of claim 5 wherein the given item of media content comprises media content for a live event.

9. The apparatus of claim 6 wherein responsive to user navigation to a playback point within the timeline that is outside of a time window of the sliding-window playlist in the live mode navigation state, the navigation state machine transitions from the live mode navigation state to the on-demand mode navigation state.

10. The apparatus of claim 1 wherein the go-live time window is shorter in duration than a time window of the sliding-window playlist.

11. The apparatus of claim 2 wherein responsive to at least one of:
(i) an end of a current version of the on-demand playlist being reached in the on-demand mode navigation state; and
(ii) user navigation to a playback point within the timeline that is outside of a time window of the on-demand playlist and outside of a specified go-live time window in the on-demand mode navigation state;
an updated version of the on-demand playlist is obtained and utilized by the client device in playing back a portion of the given item of media content in the on-demand mode navigation state.

12. The apparatus of claim 3 wherein the on-demand playlist is one of a plurality of related versions of the on-demand playlist that are sequentially created for the given item of media content by a content provider responsive to generation of respective new media segments during a live event.

13. A content delivery system comprising the apparatus of claim 4.

14. A method implemented in a client device, comprising:
obtaining a plurality of playlists for a given item of media content from one or more servers over a network, the playlists comprising at least a sliding-window playlist and an on-demand playlist for the given item of media content with each such playlist identifying a plurality of media segments of the given item of media content; and
playing back portions of the given item of media content utilizing respective ones of the sliding-window and on-demand playlists;
wherein playing back portions of the given item of media content utilizing respective ones of the sliding-window and on-demand playlists comprises switching between playback of media segments from the sliding-window playlist and playback of media segments from the on-demand playlist under the control of a navigation state machine responsive to user navigation within a timeline of the given item of media content using one or more navigational controls of the client device;
wherein the navigation state machine comprises a live mode navigation state in which the client device plays back media segments from the sliding-window playlist and an on-demand mode navigation state in which the client device plays back media segments from the on-demand playlist; and
wherein responsive to user navigation to a playback point within the timeline that is outside of a time window of the on-demand playlist but inside a specified go-live time window in the on-demand mode navigation state, the navigation state machine transitions from the on-demand mode navigation state to the live mode navigation state;

15. The method of claim 14 wherein in conjunction with a transition of the navigation state machine from the live mode navigation state to the on-demand mode navigation state, an updated version of the on-demand playlist is obtained and utilized by the client device in playing back a portion of the given item of media content.

16. The method of claim 14 wherein the given item of media content comprises media content for a live event.

17. The method of claim 14 wherein responsive to user navigation to a playback point within the timeline that is outside of a time window of the sliding-window playlist in the live mode navigation state, the navigation state machine transitions from the live mode navigation state to the on-demand mode navigation state.

18. The method of claim 14 wherein responsive to at least one of:
    (i) an end of a current version of the on-demand playlist being reached in the on-demand mode navigation state; and
    (ii) user navigation to a playback point within the timeline that is outside of a time window of the on-demand playlist and outside of a specified go-live time window in the on-demand mode navigation state;
    an updated version of the on-demand playlist is obtained and utilized in playing back a portion of the given item of media content in the on-demand mode navigation state.

19. An article of manufacture comprising a computer-readable storage medium having computer program code embodied therein, wherein the computer program code when executed in a client device causes said client device:
    to obtain a plurality of playlists for a given item of media content from one or more servers over a network, the playlists comprising at least a sliding-window playlist and an on-demand playlist for the given item of media content with each such playlist identifying a plurality of media segments of the given item of media content; and
    to play back portions of the given item of media content utilizing respective ones of the sliding-window and on-demand playlists;
    wherein playing back portions of the given item of media content utilizing respective ones of the sliding-window and on-demand playlists comprises switching between playback of media segments from the sliding-window playlist and playback of media segments from the on-demand playlist under the control of a navigation state machine responsive to user navigation within a timeline of the given item of media content using one or more navigational controls of the client device;
    wherein the navigation state machine comprises a live mode navigation state in which the client device plays back media segments from the sliding-window playlist and an on-demand mode navigation state in which the client device plays back media segments from the on-demand playlist;
    wherein in conjunction with a transition of the navigation state machine from the live mode navigation state to the on-demand mode navigation state, an updated version of the on-demand playlist is obtained and utilized by the client device in playing back a portion of the given item of media content; and
    wherein responsive to user navigation to a playback point within the timeline that is outside of a time window of the on-demand playlist but inside a specified go-live time window in the on-demand mode navigation state, the navigation state machine transitions from the on-demand mode navigation state to the live mode navigation state.

20. The article of manufacture of claim 19 wherein responsive to user navigation to a playback point within the timeline that is outside of a time window of the sliding-window playlist in the live mode navigation state, the navigation state machine transitions from the live mode navigation state to the on-demand mode navigation state.

* * * * *

UNITED STATES PATENT AND TRADEMARK OFFICE
CERTIFICATE OF CORRECTION

PATENT NO. : 9,635,431 B2  
APPLICATION NO. : 14/928031  
DATED : April 25, 2017  
INVENTOR(S) : Francis X. Zane et al.

Page 1 of 1

It is certified that error appears in the above-identified patent and that said Letters Patent is hereby corrected as shown below:

In the Claims

Claim 4, Column 13, Line 58: delete "The apparatus of claim 2" and replace it with --The apparatus of claim 1--

Claim 5, Column 13, Line 61: delete "The apparatus of claim 3" and replace it with --The apparatus of claim 1--

Claim 6, Column 13, Line 65: delete "The apparatus of claim 4" and replace it with --The apparatus of claim 1--

Claim 8, Column 14, Line 5: delete "The apparatus of claim 5" and replace it with --The apparatus of claim 1--

Claim 9, Column 14, Line 7: delete "The apparatus of claim 6" and replace it with --The apparatus of claim 1--

Claim 11, Column 14, Line 16: delete "The apparatus of claim 2" and replace it with --The apparatus of claim 1--

Claim 12, Column 14, Line 29: delete "The apparatus of claim 3" and replace it with --The apparatus of claim 1--

Claim 13, Column 14, Lines 35-36: delete "the apparatus of claim 4" and replace it with --the apparatus of claim 1--

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*